United States Patent
Rayavarapu et al.

(10) Patent No.: US 9,692,631 B2
(45) Date of Patent: Jun. 27, 2017

(54) LOAD SENSITIVE DATA SESSION SCHEDULING MECHANISMS OF WIRELESS/WIRELINE ACCESS NETWORKS

(75) Inventors: Venkata Ratnakar Rao Rayavarapu, Bangalore (IN); David Steer, Nepean (CA)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 13/822,407

(22) PCT Filed: Dec. 9, 2010

(86) PCT No.: PCT/IB2010/055702
§ 371 (c)(1),
(2), (4) Date: Mar. 12, 2013

(87) PCT Pub. No.: WO2012/076932
PCT Pub. Date: Jun. 14, 2012

(65) Prior Publication Data
US 2013/0166760 A1 Jun. 27, 2013

(51) Int. Cl.
H04L 29/06 (2006.01)
H04L 29/08 (2006.01)

(52) U.S. Cl.
CPC ........ *H04L 29/06537* (2013.01); *H04L 69/24* (2013.01); *H04L 67/06* (2013.01); *H04L 67/325* (2013.01)

(58) Field of Classification Search
None
See application file for complete search history.

(56) References Cited

U.S. PATENT DOCUMENTS 6,675,212 B1 * 1/2004 Greenwood ...... G06F 17/30899
707/E17.119
7,017,188 B1 * 3/2006 Schmeidler ............. G06F 21/10
705/57

(Continued)

FOREIGN PATENT DOCUMENTS

CN 1759542 A 4/2006
CN 101155053 A 4/2008

(Continued)

OTHER PUBLICATIONS

Laoutaris, Nikolaos, et al. "Delay tolerant bulk data transfers on the internet." ACM SIGMETRICS Performance Evaluation Review. vol. 37. No. 1. ACM, 2009.*
https://msdn.microsoft.com/en-us/library/ms811838.aspx[Sep. 25, 2015 1:17:46 PM]; https://www.google.com/...3AIE-Address&source=Int&tbs=cdr%3A1%2Ccd_min%3A%Ccd_max%3A2010&tbm=#tbs=cdr:1%2Ccd_max:2010&q=scheduled+download+request[Sep. 25, 2015 1:16:46 PM], shows date as Apr. 1, 2002.*

(Continued)

*Primary Examiner* — Scott B Christensen
*Assistant Examiner* — Sean Concannon
(74) *Attorney, Agent, or Firm* — Conley Rose, P.C.; J. Robert Brown, Jr.

(57) ABSTRACT

A method and apparatus to link user requirements of data sessions to the network conditions provides an application making an advance request corresponding to a data session, which a communication device may immediately acknowledge but will attend to the request at its convenience. The data session setup is based on the actual network conditions which are either sensed by the device or provided by an agent in the network. The method may be overlaid on top of existing wireless handsets using existing technologies. Hence, all the flexibility and configurability associated with data sessions offered by the existing solutions may remain intact with added features for the customer and the operator. In various exemplary embodiments, the method may use a network load measurement capability in the device and/or a network agent.

20 Claims, 4 Drawing Sheets

(56) References Cited

U.S. PATENT DOCUMENTS

| | | | | |
|---|---|---|---|---|
| 2003/0069964 A1* | 4/2003 | Shteyn | ............... | H04L 29/06 709/225 |
| 2004/0180677 A1 | 9/2004 | Harris et al. | | |
| 2004/0193726 A1* | 9/2004 | Gatto et al. | ............... | 709/238 |
| 2005/0027818 A1* | 2/2005 | Friedman et al. | ............... | 709/217 |
| 2006/0020598 A1* | 1/2006 | Shoolman | ............... | H04L 67/1027 |
| 2008/0069141 A1* | 3/2008 | Bonaguro | ............... | G06Q 30/00 370/469 |
| 2008/0244033 A1* | 10/2008 | Hook | ............... | G06F 17/30017 709/217 |
| 2009/0147692 A1* | 6/2009 | Hasan | ............... | H04L 41/5009 370/252 |
| 2010/0011091 A1* | 1/2010 | Carver et al. | ............... | 709/219 |
| 2010/0246427 A1* | 9/2010 | Gheorghiu et al. | ............... | 370/252 |
| 2010/0322089 A1* | 12/2010 | Raja | ............... | H04L 41/5009 370/252 |
| 2011/0055413 A1* | 3/2011 | Lobsenz | ............... | G06Q 10/06 709/231 |
| 2011/0164504 A1* | 7/2011 | Bothos et al. | ............... | 370/237 |
| 2012/0099430 A1* | 4/2012 | Vos et al. | ............... | 370/235 |
| 2012/0307049 A1* | 12/2012 | Mimar | ............... | G08B 13/19676 348/143 |

FOREIGN PATENT DOCUMENTS

| | | |
|---|---|---|
| CN | 101326846 A | 12/2008 |
| EP | 1793631 A1 | 6/2007 |
| WO | 0147299 A1 | 6/2001 |
| WO | 2007069941 A1 | 6/2007 |

OTHER PUBLICATIONS

International Preliminary Report on Patentability for International Application No. PCT/IB2010/055702; International Filing Date: Dec. 9, 2010; Date of Mailing: Jul. 20, 2013; pp. 1-8.

Xin Liu, et al., "Transmission Scheduling for Efficient Wireless Utilization," INFOCOM 2001, pp. 1-10.

Andreas Senst, et al., "A Wireless Revenue Based Scheduler with QoS Support," 41st Annual Allerton Conference on Communications, Control and Computing, Sep. 2003, pp. 1-7.

Softpedia, [online]; [retrieved on Mar. 12, 2013]; retrieved from the Internet http://www.softpedia.com/get/Internet/Download-Managers/Internet-Download-Manager.shtml Softpedia, Softpedia Editor's Review for Internet Download Manager Bogdan Popa, "Schedule, Resume and Accelerate Downloads by up to 5 times with this very good accelerator," Softpedia, Dec. 17, 2012, pp. 1-4.

PCT International Search Report and Written Opinion; International Application No. PCT/IB2010/055702; International Filing Date: Dec. 9, 2010; Date of Mailing: Jun. 20, 2011; pp. 1-11.

Canadian Office Action; Application No. 2,820,153; Mar. 3, 2015; 3 pages.

Chinese Office Action as Received in Co-Pending Application No. 201080070583.5 on Jul. 14, 2015; 8 pages. (No English translation available).

Chinese Office Action; Application No. 201080070583.5; Feb. 1, 2016; 15 pages.

* cited by examiner

LOAD SENSITIVE DATA SESSION SCHEDULING MECHANISMS OF WIRELESS/WIRELINE ACCESS NETWORKS

PRIORITY

This is a U.S. National Stage Application of International Application No. PCT/IB2010/055702, entitled "LOAD SENSITIVE DATA SESSION SCHEDULING MECHANISMS FOR WIRELESS/WIRELINE ACCESS NETWORKS", filed Dec. 9, 2010, which is incorporated herein by reference in its entirety.

BACKGROUND

Field

The present general concept relates to data transmission in communications systems and more particularly card application toolkit support for Internet Protocol (IP) multimedia systems.

Description of the Related Art

In known wireless telecommunications systems, transmission equipment in a base station or access device transmits signals throughout a geographical region known as a cell. As technology has evolved, more advanced equipment has been introduced that can provide services (including higher data rates and better managed quality of service) that were not possible previously. This advanced equipment might include, for example, an E-UTRAN (evolved universal terrestrial radio access network) node B (eNB), a base station or other systems and devices. Such advanced or next generation equipment is often referred to as long-term evolution (LTE) equipment, and a packet-based network that uses such equipment is often referred to as an evolved packet system (EPS). An access device is any component, such as a traditional base station or an LTE eNB (Evolved Node B), that can provide a user agent (UA), such as user equipment (UE) or mobile equipment (ME), with access to other components in a telecommunications system.

In mobile communication systems such as an E-UTRAN, the access device provides radio accesses to one or more UAs. The access device comprises resource scheduling functionality for allocating uplink (UL) and downlink (DL) data transmission resources among all the UAs communicating to the access device. The functions of the scheduler include, among others, dividing the available air interface capacity between the UAs, deciding the resources (e.g. sub-carrier frequencies and timing) to be used for each UA's packet data transmission, and monitoring packet allocation and system load.

An issue relating to mobile communications systems may be experienced when performing downloads (such as Internet downloads or file transfers) on a wireless and/or wired communication network. Often when performing such as downloads or file transfers, users can experience low data rates and relatively lengthy download times. Similar issues can be present with uploads. This issue can occur in spite of the use of high bandwidth technologies for access due to various reasons such as network congestion and limited network capacity. Even with technologies such as HSPA (High Speed Packet Access) or LTE (Long Term Evolution) that provide large data pipes during peak usage times, the pipe may be shared among large numbers of users which thus limits data throughput per user.

In many cases, users will typically be satisfied with their system performance if their download is completed by a certain time irrespective of when and how the download happens. For example, a user may wish to download music albums or movies online (either via a wired or wireless network). When the user initiates these downloads on the move or in the office they may not be interested in immediately listening/watching the media. This user would likely not mind if the download is complete by the time they arrive home or before the weekend. Even leisure users, in some cases, may not mind waiting for a day or two for a download to complete (as, for example, they can always watch/listen to the download they have initiated a day before). The same issue can also apply equally for data uploads. From the network's perspective when more and more users start accessing the network during peak-hours, the network load and congestion will increase. Delay insensitive data sessions can often choke the network pipe, thus affecting other users who may desire faster response times. To address this issue, users might be billed at a premium for the network usage during peak-hours or be penalized in other ways due to lengthier download times. At other times however, network capacity may be under-utilized during off-peak hours resulting in lost revenue and reduced average network efficiency for operators.

In certain known applications a user (or user client) can connect to the network at scheduled time and date to schedule a data transfer. However these applications do not consider whether the network conditions are optimal to access the service at that instant. Thus, additional session requests when received at an inappropriate time can actually increase the load on the network without any net improvement in the service. Likewise network scheduling strategies may be defined which try to optimize the wireless utilization based on various criteria. However these scheduling strategies help the users with their throughputs only if users make a data session request when the conditions are favorable.

Thus, it would be desirable to provide a solution that links user requirements of data sessions to the network conditions and achieves mutually beneficial results for the user and for the network.

BRIEF DESCRIPTION OF THE DRAWINGS

The present teachings may be better understood, and its numerous features and utility made apparent to those skilled in the art by referencing the accompanying drawings. The use of the same reference number throughout the several figures designates a like or similar element.

DETAILED DESCRIPTION

Figure 1:
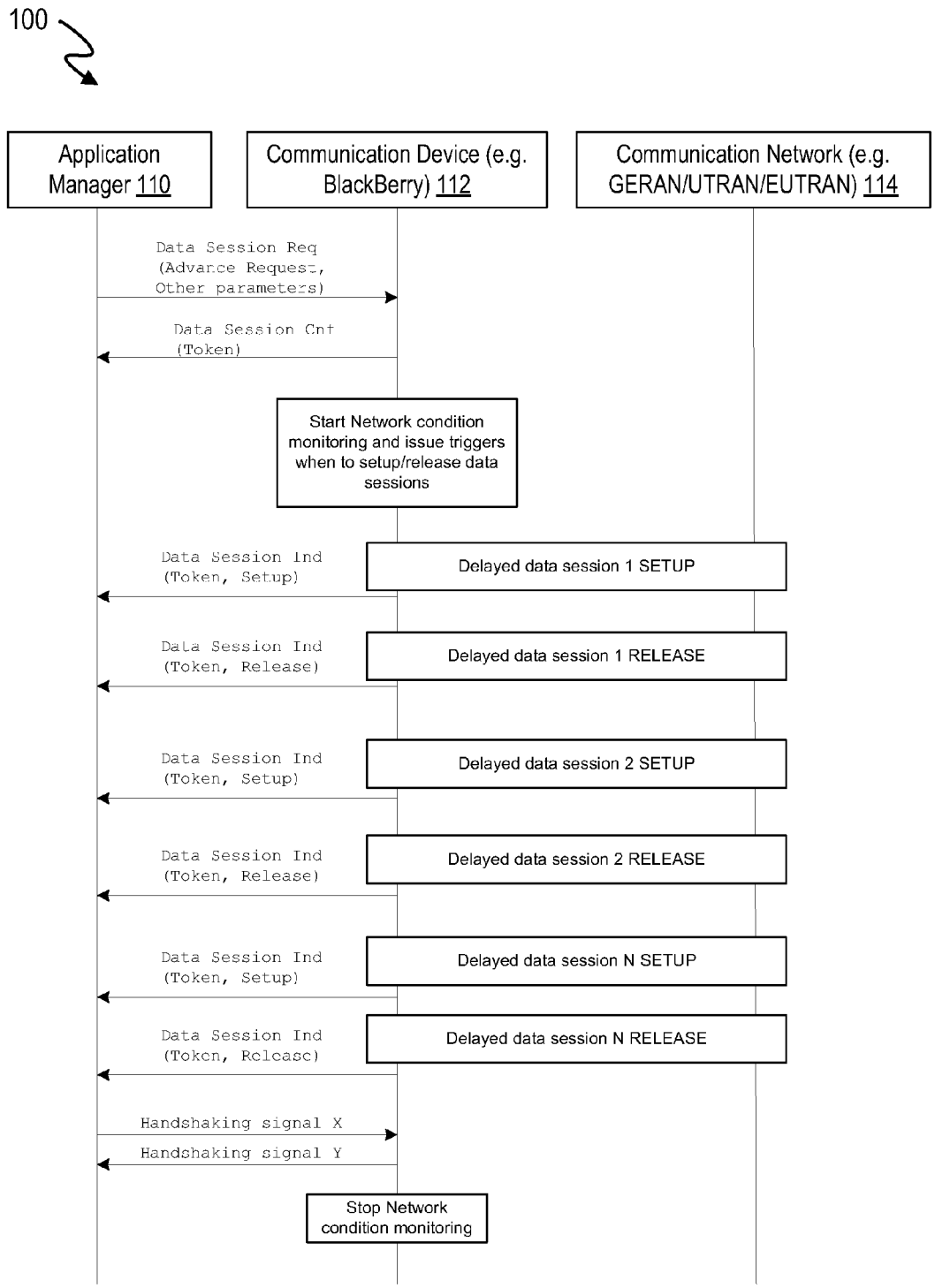
FIG. 1 shows a timing diagram of communication between an application manager, a communication device and a communication network.

In accordance with the present teachings, a method and apparatus to link user requirements of data sessions to the network conditions is set forth. Such a method and apparatus provides an application making an advance request of a data session which communication device will immediately acknowledge but will attend to the request at its convenience. The delayed data session setup is based on the actual network conditions which are either sensed by the device or provided by an agent in the network. The method can be overlaid on top of existing wireless handsets using current and future technologies. Hence all the flexibility and configurability associated with data sessions offered by the existing solutions can remain intact with added features that may be realized by the customer and the operator. In various exemplary embodiments, the method makes use of a network load measurement capability in the device and/or a network agent.

For each data session request, an entity managing user applications (based on user input or preset settings) can indicate to a communication device if the data session is required for immediate use or of if it is an advance request of a data session that may be delayed if needed to suit network conditions. In certain exemplary embodiments, along with this request, a set of optional information elements can be included. For example, these elements can include an identifier of the application session that wishes to use the data pipe, details of the requested data session such as an amount of data to be downloaded, the latest time by when the download should have been completed, and information regarding billing periods and preferences. For immediate data session requests, the communication device initiates a data session setup immediately as it normally would. For advance requests, the communication device stores the request and provides an acknowledgement to the application manager with a token corresponding to the request. The communication device serves these advance requests by means of a number of delayed data sessions each of them being setup or torn down at suitable times in a load sensitive way based on knowledge of network conditions and the user's expectation for the data/information availability.

The delayed scheduling of data sessions in a load-sensitive way is achieved by the communication device using one or a combination of a plurality of methods. For example, in one method, for each delayed data session scheduled, the communication device notifies the application manager with a token corresponding to a previous request and an indication of the available data pipe. The application manager then uses the available data pipe for a specific application or a combination of applications until the data session is completed or the communication device closes the pipe. The communication device also uses the other preferences information provided in the session request to determine when to setup or release a data session. The application manager and the communication device regularly exchange handshaking signals to share the status of various data sessions, available data, pipes and/or bandwidth. Based on this handshaking, the available data pipe can be flexibly managed and if desired, the application manager can reconfigure certain application sessions for immediate access.

Various exemplary embodiments of the present teachings will now be described in detail with reference to the accompanying figures. While various details are set forth in the following description, it will be appreciated that the present teachings may be practiced without these specific details, and that numerous implementation-specific decisions may be made to the teachings described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flow chart form, rather than in detail, in order to avoid limiting or obscuring the present teachings. In addition, some portions of the detailed descriptions provided herein are presented in terms of algorithms or operations on data within a computer memory. Such descriptions and representations are used by those skilled in the art to describe and convey the substance of their work to others skilled in the art.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, or a computer. By way of illustration, both an application running on a computer and the computer itself can be a component. One or more components may reside within a process or thread of execution and a component may be localized on one computer or distributed between two or more computers.

Referring to FIG. 1, a timing diagram of communication between an application manager, a communication device and a communication network corresponding to delayed scheduling of data sessions is shown. The timing occurs between an application manager 110, a communication device 112 and a communication network 114. (The communication network 114 may contain a server node that is providing the data services requested by the delayed data session.)

The communication device 112 measures the network load via one or more of a plurality of methods. These methods can include observing the busyness of the paging channel (e.g., lots of pages means a busy network), observing the downlink control channel signaling (e.g. downlink traffic map in Long Term Evolution (LTE) or Worldwide Interoperability for Microwave Access (WiMAX) type network where an empty or largely unoccupied map indicates idle capacity) or measuring the delay in signaling packets sent to the network (e.g., by performing pings to the network). Specific communication devices (such as BlackBerry type communications devices) also often regularly interact with specific communication networks and relays (such as a Research In Motion network) to maintain contact between the communication device 112 and the communication network 114. Timing of signaling interactions in these specific networks can also serve as measures of the network response time and congestion. The communication device 112 can observe these measures over an interval to determine an average condition and then initiate the download over-the-air when the measured traffic level is below the average. The communications device may also interact with the server node in the network that may be servicing the delayed data session to measure the busyness of the server. This interaction may take the form, for example, of direct inquiry as to the load or indirectly, for example, from the latency in a ping message to the server. This interaction enables the delayed data session to be also scheduled to accommodate the loading of the server.

Based on the information the communication device 112 gathers by sensing the air interface or from the information available in signaling from the communication network 114, the communication device 112 can also consider using alternate networks of the download (e.g. the download may happen over a different network than the one that was active at the time of the user's request). For example a WiFi connection could be used instead of a mobile communication connection such as a Global System for Mobile Communications/Universal Mobile Telecommunications System (GSM/UMTS). Alternately, the communication device 112 can decide to use another network that is less expensive (e.g. Carrier A instead of Carrier B), or wait until the user is back in their home network (to avoid roaming fees), or wait until an LTE channel is available (rather than just using GSM/UMTS).

More specifically, the communication for delayed scheduling of data sessions starts by the application manager 110 generating a data session request to the communication device. The data session request can include the advance data session request as well as other parameters (e.g. details of the requested data session such as an amount of data to be downloaded, the latest time by when the download should have been completed, and information regarding network subscriptions, billing periods and preferences). The communication device then returns a data session confirmation to the application manager. In certain exemplary embodiments, this confirmation may include a token. The communication device 112 is configured so that network condition monitoring is operating and to issue triggers when to setup and/or release data session based upon the network monitoring.

Based upon the network condition monitoring, a delayed data session is setup between the communication device 112 and the communication network 114. A data session identifier is provided by the communication device 112 to the application manager 110 which includes a token (i.e., an identifier of a transaction between the application manager and the communication device) as well as a setup indication. Data is then exchanged between the application manager 110 and the server providing the service in the communications network 114. At some later time, the communication device 112 determines that it is appropriate to release the delayed data session. (The release may be due to the actual completion of the data transfer or the communication network forcibly releasing the connection or the communication device voluntarily releasing the connection based on network load monitoring.) The communication device 112 and the communication network 114 perform a delayed data session release operation. In response to this release, the communication device 112 generates a data session identifier which includes a token and a release indication.

Next, at some later time based upon the network condition monitoring, a second delayed data session is setup between the communication device 112 and the communication network 114. A second data session identifier is provided by the communication device 112 to the application manager 110 which includes a token as well as a setup indication. At some later time, the communication device 112 determines that it is appropriate to release the second delayed data session. The communication device 112 and the communication network 114 perform a second delayed data session release operation. In response to this release, the communication device 112 generates a second data session identifier which includes a token and a release indication. This process is repeated up through N delayed data sessions until the communications required by the application is completed.

After a final desired delayed data session, as determined by the application manager 110, handshaking signals X and Y are generated by the application manager 110 and the communication device 112, respectively to end the series of delayed data sessions. After the hand shaking operation, the communication device stops network condition monitoring.

Note that in some instances only a single delayed data session may be required to fulfill the application requirements.

Figure 2:
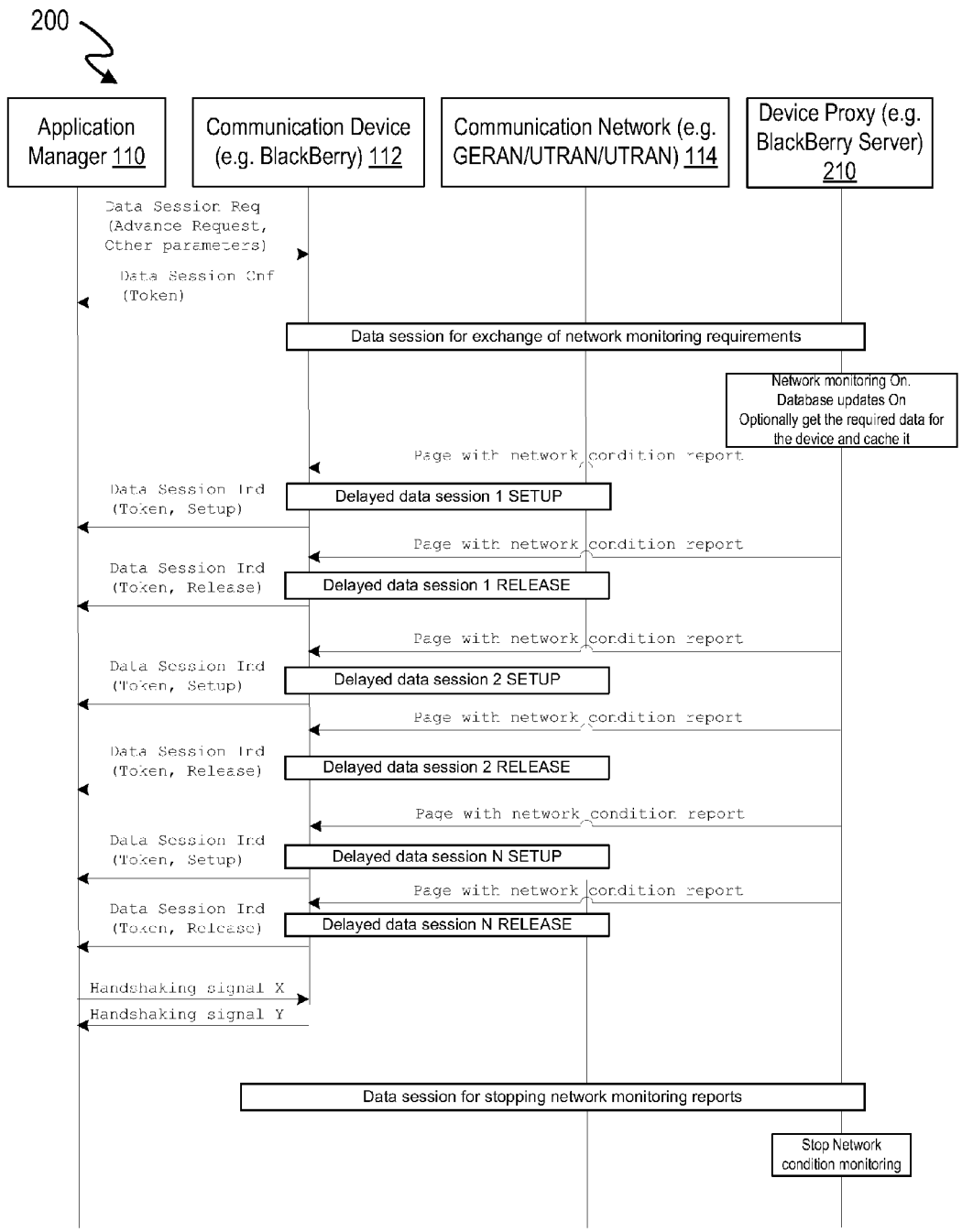
FIG. 2 shows another timing diagram of communication between an application manager, a communication device and a communication network.

Referring to FIG. 2, a timing diagram of communication 200 between an application manager 110, a communication device 112, a communication network 114 and a server 210 of delayed scheduling of data sessions is shown.

With this method of delayed scheduling of data sessions, a device server 210 (e.g., a server such as a Blackberry server) is provided (e.g., located somewhere in an Internet cloud or network 114) which is accessible to the communication device 112. The server 210 maintains a database of network traffic conditions and capacity/load patterns. The server 210 can also access real-time and non-real-time housekeeping data shared by network operators (i.e., carriers) and network partners. This data supplied by the network operators can include statistics related to channel conditions, capacity availability, and congestion and channel quality which the network operators are generating and/or using for their operations. The communication device 112 registers with this server 210 (e.g., a RIM server connected to BlackBerry access point name (APN)) of a network conditions report. In certain exemplary embodiments, multiple service providers can be operating over the same access network and the service access point of each service provider is designated with an APN. For example in the United Kingdom (UK), a Vodafone access network allows users to connect to Vodafone APN (for WAP services), Blackberry APN (for Blackberry email, messenger, etc.) and emergency services APN. Primarily, the APN provides an access network that throttles the data pipe, so in that sense the communication device 112 will receive one conditions report. However, in certain exemplary embodiments, it is possible that multiple network condition reports (access network+service provider network) may be generated per APN.

The communication device 112 then periodically receives a network conditions report from the server 210 which is generated based on the location and other requirements of the communication device 112 (e.g. the report will be based on the network conditions related to communications with the device and the conditions of the device's delayed session requests). Based on these reports, the communication device 112 can setup or release data sessions or both. Alternatively the server 210 can indicate a data session setup and/or release flag to the communication device 112 by comparing device requirements with actual network conditions. Using this server 210 provides an additional feature when delaying scheduling of data sessions. More specifically, some information to be downloaded by a user may change over time and hence there is a risk when delaying scheduling of data sessions that the information the user wishes to download is not available in the same form when the information is actually downloaded. In these cases, this server 210 can be made to act as a proxy for the communication device 112. In this scenario, the communication device 112 interacts with an agent in the server 210. The agent downloads the information from the source immediately, but stores the information in a cache. The information in the cache can then be downloaded to the communication device 112 at a later time in delayed data sessions. This process ensures that the device application receives the data as it was at the time of the initial request, even if it may have changed before the delayed download to the device. In some other instances, the device application may desire to always receive the latest information in the delayed download. To enable this, the device application indicates (using a parameter passed to the communications device and the device proxy) that the delayed download should be of the latest information. In this case, the proxy server delays its interaction with the data server until the delayed download is initiated. The device application thus receives the latest information available (this could be, for example, a current transit timetable rather than one for the previous day).

More specifically, the communication corresponding to delayed scheduling of data sessions starts by the application manager 110 generating a data session request to the communication device. The data session request can include the advance data session request as well as other parameters (e.g., details of the requested data session such as an amount of data to be downloaded, revision status, the latest time by when the download should have been completed, and information regarding network subscriptions, billing periods and preferences). The communication device then returns a data session confirmation to the application manager. In certain exemplary embodiments, this confirmation may include a token. Next, a data session is established among the communication device 112, the communication network 114 and the server 210. The server is configured so that network monitoring is operating, database updates are operating and may be optionally (based on a revision status parameter) configured to obtain information of the communication device and to cache this information.

The server 210 then communicates the page with a network condition report to the communication device 112. Based upon this information, a delayed data session is setup between the communication device 112, the communication network 114 and the server 210. A data session identifier is provided by the communication device 112 to the application manager 110 which includes a token as well as a setup indication. At some later time (when network conditions are suitable for the data session), the server 210 communicates a page with a network condition report to the communication device 112 which indicates that it is time to initiate the delayed data session. The communication device 112 and the communication network 114 perform a delayed data session release operation. In response to this release, the communication device 112 generates a data session identifier which includes a token and a release indication.

Next, at some later time, the server 210 communicates a second page with a network condition report to the communication device 112. Based upon this information, a second delayed data session is setup between the communication device 112 and the communication network 114. A second data session identifier is provided by the communication device 112 to the application manager 110 which includes a token as well as a setup indication. At some later time, the server 210 communicates a page with a network condition report to the communication device 112 which indicates that it is time to initiate the second delayed data session. The communication device 112 and the communication network 114 perform a second delayed data session release operation. In response to this release, the communication device 112 generates a data session identifier which includes a token and a release indication. This process is repeated up through N delayed data sessions.

After a final desired delayed data session, as determined by the application manager 110, handshaking signals X and Y are generated by the application manager 110 and the communication device 112, respectively. After the hand shaking operation, a data session is established among the communication device 112, the communication network 114 and the server 210 to stop generation of the network monitoring reports, after which the server 210 stops performing the network condition reporting. Note that in some instances only a single delayed data session may be required to fulfill the application requirements.

Figure 3:
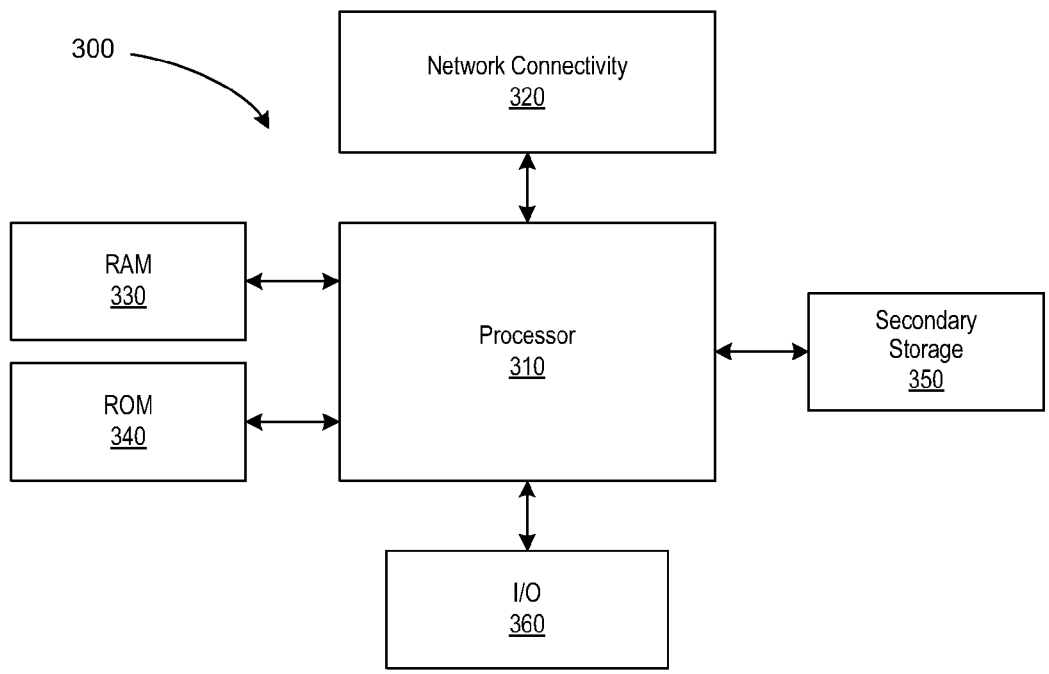
FIG. 3 depicts an exemplary system in which the present teaching may be implemented.

FIG. 3 illustrates an example of a system 300 suitable to implement one or more exemplary embodiments disclosed herein. In various exemplary embodiments, the system 300 comprises a processor 310, which may be referred to as a central processor unit (CPU) or digital signal processor (DSP), network connectivity devices 320, random access memory (RAM) 330, read only memory (ROM) 340, secondary storage 350, and input/output (I/O) devices 360. In some exemplary embodiments, some of these components may not be present or may be combined in various combinations with one another or with other components not shown. These components may be located in a single physical entity or in more than one physical entity. Any actions described herein as being taken by the processor 310 might be taken by the processor 310 alone or by the processor 310 in conjunction with one or more components shown or not shown in FIG. 3.

The processor 310 executes instructions, codes, computer programs, or scripts that it might access from the network connectivity devices 320, RAM 330, or ROM 340. While only one processor 310 is shown, multiple processors may be present. Thus, while instructions may be discussed as being executed by a processor 310, the instructions may be executed simultaneously, serially, or otherwise by one or multiple processors 310 implemented as one or more CPU chips.

In various exemplary embodiments, the network connectivity devices 320 may take the form of devices capable of connecting to networks including, but not limited to, modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices. These network connectivity devices 320 may enable the processor 310 to communicate with the Internet or one or more telecommunications networks or other networks from which the processor 310 might receive information or to which the processor 310 might output information.

The network connectivity devices 320 may also be capable of transmitting or receiving data wirelessly in the form of electromagnetic waves, such as radio frequency signals or microwave frequency signals. Information transmitted or received by the network connectivity devices 320 may include data that has been processed by the processor 310 or instructions that are to be executed by processor 310. The data may be ordered according to different sequences as may be desirable to either process or generate the data or to transmit or receive the data.

In various exemplary embodiments, the RAM 330 may be used to store volatile data and instructions that are executed by the processor 310. The ROM 340 shown in FIG. 3 may be used to store instructions and perhaps data that are read during execution of the instructions. Access to both RAM 330 and ROM 340 is typically faster than to secondary storage 350. The secondary storage 350 is typically comprised of one or more disk drives or tape drives and may be used for non-volatile storage of data or as an over-flow data storage device if RAM 330 is not large enough to hold all working data. Secondary storage 350 may be used to store programs that are loaded into RAM 330 when such programs are selected for execution. The I/O devices 360 may include liquid crystal displays (LCDs), touch screen displays, keyboards, keypads, switches, dials, mice, track balls, voice recognizers, card readers, paper tape readers, printers, video monitors, or other well-known input/output devices.

Figure 4:
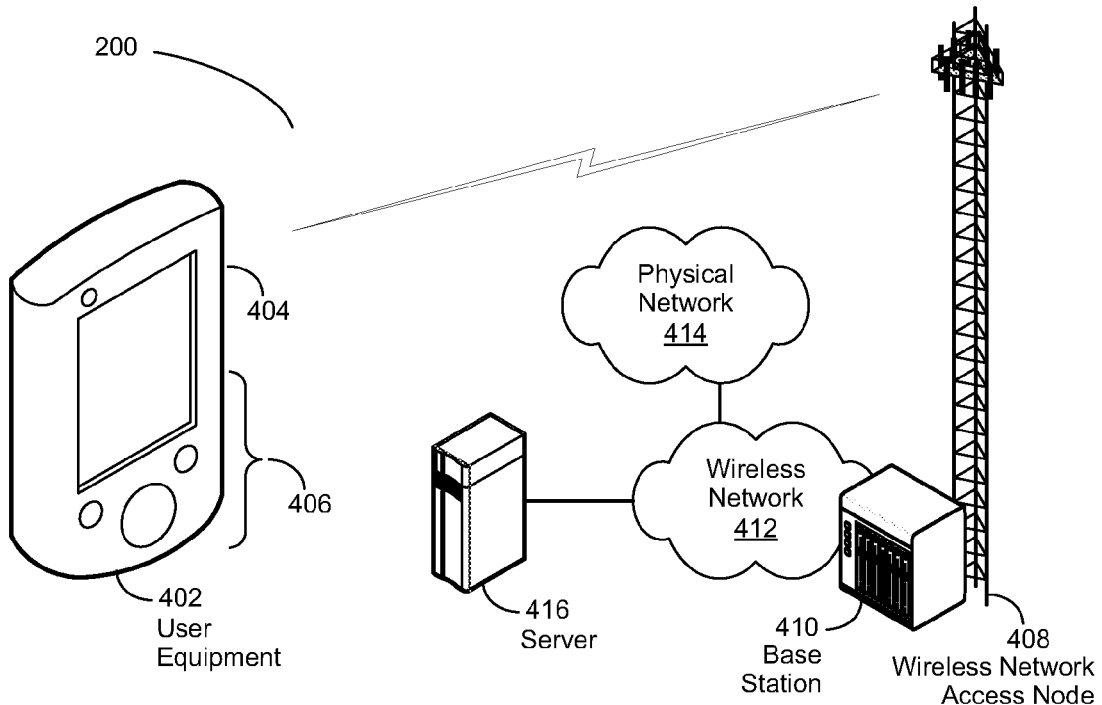
FIG. 4 shows a wireless communications system including an exemplary embodiment of a user equipment (UE)

FIG. 4 shows a wireless communications system including an exemplary embodiment of user equipment (UE) 402. Though illustrated as a mobile phone, the UE 402 may take various forms including a wireless handset, a pager, a personal digital assistant (PDA), a portable computer, a tablet computer, or a laptop computer. Many suitable devices combine some or all of these functions. In some exemplary embodiments, the UE 402 is not a general purpose computing device like a portable, laptop or tablet computer, but rather is a special-purpose communications device such as a mobile phone, a wireless handset, a pager, a PDA, or a telecommunications device installed in a vehicle. The UE 402 may likewise be a device, include a device, or be included in a device that has similar capabilities but that is not transportable, such as a desktop computer, a set-top box, or a network node. In these and other exemplary embodiments, the UE 402 may support specialized activities including, but not limited to, gaming, inventory control, job control, and task management functions.

In various exemplary embodiments, the UE 402 includes a display 404. The UE 402 likewise includes a touch-sensitive surface, a keyboard or other input keys 406 generally used for input by a user. In these and other environments, the keyboard may be a full or reduced alphanumeric keyboard such as QWERTY, Dvorak, AZERTY, and sequential keyboard types, or a traditional numeric keypad with alphabet letters associated with a telephone keypad. The input keys may likewise include a trackwheel, an exit or escape key, a trackball, and other navigational or functional keys, which may be inwardly depressed to provide further input function. The UE 402 may likewise present options for the user to select, controls for the user to actuate, and cursors or other indicators for the user to direct.

The UE 402 may further accept data entry from the user, including numbers to dial or various parameter values to configure the operation of the UE 402. The UE 402 may further execute one or more software or firmware applications in response to user commands. These applications may configure the UE 402 to perform various customized functions in response to user interaction. Additionally, the UE 402 may be programmed or configured over-the-air (OTA), for example from a wireless base station 410, a server 416, a wireless network access node 408, or a peer UE 402.

Among the various applications executable by the UE 300 are a web browser, which enables the display 404 to display a web page. The web page may be obtained via wireless communications with a wireless network access node 408, such as a cell tower, a peer UE 402, or any other wireless communication network 412 or system. In various exemplary embodiments, the wireless network 412 is coupled to a wired network 414, such as the Internet. Via the wireless network 412 and the wired network 414, the UE 402 has access to information on various servers, such as a server 416. The server 416 may provide content that may be shown on the display 404. Alternately, the UE 402 may access the wireless network 412 through a peer UE 402 acting as an intermediary, in a relay type or hop type of connection. Skilled practitioners of the art will recognized that many such exemplary embodiments are possible and the foregoing is not intended to limit the spirit, scope, or intention of the disclosure.

Figure 5:
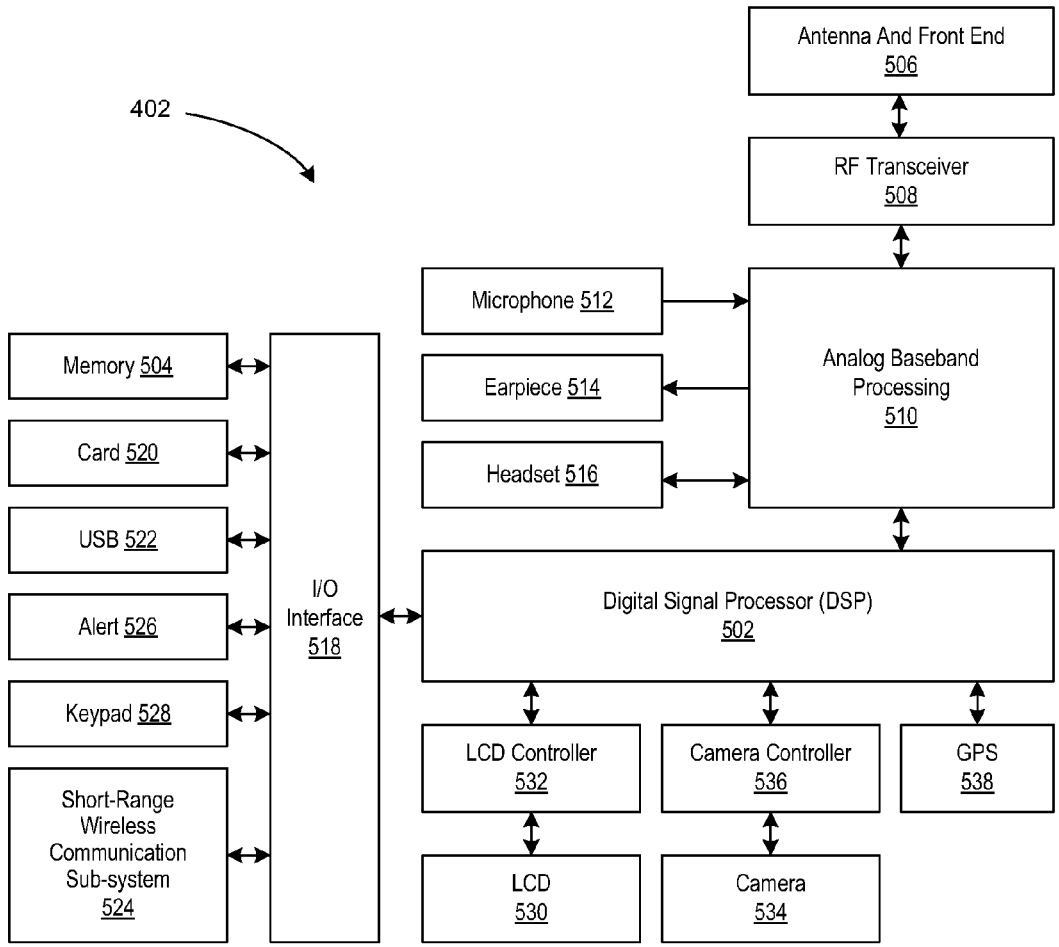
FIG. 5 is a simplified block diagram of an exemplary UE comprising a digital signal processor (DSP)

FIG. 5 depicts a block diagram of an exemplary user equipment (UE) 402 in which the present teachings may be implemented. While various components of a UE 402 are depicted, various exemplary embodiments of the UE 402 may include a subset of the listed components or additional components not listed. As shown in FIG. 5, the UE 402 includes a digital signal processor (DSP) 502 and a memory 504. As shown, the UE 402 may further include an antenna and front end unit 506, a radio frequency (RF) transceiver 508, an analog baseband processing unit 510, a microphone 512, an earpiece speaker 514, a headset port 516, an input/output (I/O) interface 518, a removable memory card 520, a universal serial bus (USB) port 522, a short range wireless communication sub-system 524, an alert 526, a keypad 528, a liquid crystal display (LCD) 530, which may include a touch sensitive surface, an LCD controller 532, a charge-coupled device (CCD) camera 534, a camera controller 536, and a global positioning system (GPS) sensor 538. In various exemplary embodiments, the UE 402 may include another kind of display that does not provide a touch sensitive screen. In an exemplary embodiment, the DSP 502 may communicate directly with the memory 504 without passing through the input/output interface 518.

In various exemplary embodiments, the DSP 502 or some other form of controller or central processing unit (CPU) operates to control the various components of the UE 402 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The antenna and front end unit 506 may be provided to convert between wireless signals and electrical signals, enabling the UE 402 to send and receive information from a cellular network or some other available wireless communications network or from a peer UE 402. In an exemplary embodiment, the antenna and front end unit 306 may include multiple antennas to support beam forming or multiple input multiple output (MIMO) operations or both. As is known to those skilled in the art, MIMO operations may provide spatial diversity which can be used to overcome difficult channel conditions or to increase channel throughput. Likewise, the antenna and front end unit 506 may include antenna tuning or impedance matching components, RF power amplifiers, or low noise amplifiers.

In various exemplary embodiments, the RF transceiver 508 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF or radio stage or both, and conceptually allocates that signal processing to the analog baseband processing unit 510 or the DSP 502 or other central processing unit. In some exemplary embodiments, the RF Transceiver 308, portions of the Antenna and Front End 506, and the analog base band processing unit 510 may be combined in one or more processing units or application specific integrated circuits (ASICs) or both.

The analog baseband processing unit 510 may provide various analog processing of inputs and outputs, for example analog processing of inputs from the microphone 512 and the headset 516 and outputs to the earpiece 514 and the headset 516. To that end, the analog baseband processing unit 510 may have ports connectable to the built-in microphone 512 and the earpiece speaker 514 that enable the UE 402 to be used as a cell phone. The analog baseband processing unit 510 may further include a port connectable to a headset or other hands-free microphone and speaker configuration. The analog baseband processing unit 510 may provide digital-to-analog conversion in one signal direction and analog-to-digital conversion in the opposing signal direction. In various exemplary embodiments, at least some of the functionality of the analog baseband processing unit 510 may be provided by digital processing components, for example by the DSP 502 or by other central processing units.

The DSP 502 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an exemplary embodiment, for example in a code division multiple access (CDMA) technology application, corresponding to a transmitter function the DSP 502 may perform modulation, coding, interleaving, and spreading, and corresponding to a receiver function the DSP 502 may perform despreading, deinterleaving, decoding, and demodulation. In another exemplary embodiment, for example in an orthogonal frequency division multiplex access (OFDMA) technology application, corresponding to the transmitter function the DSP 502 may perform modulation, coding, interleaving, inverse fast Fourier transforming, and cyclic prefix appending, and corresponding to a receiver function the DSP 502 may perform cyclic prefix removal, fast Fourier transforming, deinterleaving, decoding, and demodulation. In other wireless technology applications, yet other signal processing functions and combinations of signal processing functions may be performed by the DSP 502.

The DSP 502 may communicate with a wireless network via the analog baseband processing unit 510. In some exemplary embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB interface 522 and the short range wireless communication sub-system 524. The USB interface 522 may be used to charge the UE 402 and may also enable the UE 402 to function as a peripheral device to exchange information with a personal computer or other computer system. The short range wireless communication sub-system 524 may include an infrared port, a Bluetooth interface, an IEEE 802.11 compliant wireless interface, or any other short range wireless communication sub-system, which may enable the UE 402 to communicate wirelessly with other nearby mobile devices or wireless base stations or both.

The input/output interface 518 may further connect the DSP 502 to the alert 526 that, when triggered, causes the UE 402 to provide a notice to the user, for example, by ringing, playing a melody, or vibrating. The alert 526 may serve as a mechanism to alert the user to any of various events such as an incoming call, a new text message, and an appointment reminder by silently vibrating, or by playing a specific pre-assigned melody of a particular caller.

The keypad 528 couples to the DSP 502 via the I/O interface 518 to provide one mechanism to the user to make selections, enter information, and otherwise provide input to the UE 402. The keyboard 528 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 530, which may include touch screen capability and also display text or graphics, or both, to the user. The LCD controller 532 couples the DSP 502 to the LCD 530.

The CCD camera 534, if equipped, enables the UE 402 to take digital pictures. The DSP 502 communicates with the CCD camera 534 via the camera controller 536. In another exemplary embodiment, a camera operating according to a technology other than Charge Coupled Device cameras may be employed. The GPS sensor 538 is coupled to the DSP 502 to decode global positioning system signals, thereby enabling the UE 402 to determine its position. Various other peripherals may also be included to provide additional functions, such as radio and television reception.

Figure 6:
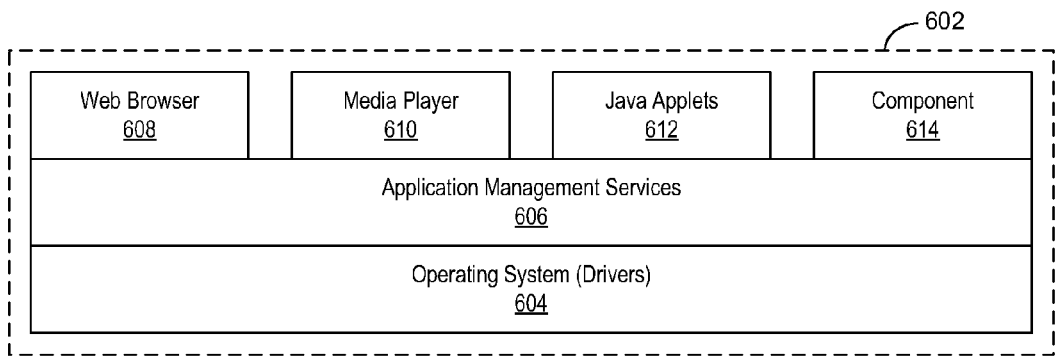
FIG. 6 is a simplified block diagram of a software environment that may be implemented by the DSP.

FIG. 6 illustrates a software environment 602 that may be implemented by the DSP 502. The DSP 502 executes operating system drivers 604 that provide a platform from which the rest of the software operates. The operating system drivers 604 provide drivers to the UE 402 hardware with standardized interfaces that are accessible to application software. The operating system drivers 604 include application management services (AMS) 606 that transfer control between applications running on the UE 402. Also shown in FIG. 6 are a web browser application 608, a media player application 610, and Java applets 612. The web browser application 608 configures the UE 402 to operate as a web browser, allowing a user to enter information into forms and select links to retrieve and view web pages. The media player application 610 configures the UE 402 to retrieve and play audio or audiovisual media. The Java applets 612 configure the UE 402 to provide games, utilities, and other functionality. A component 614 might provide functionality described herein. The UE 402, a base station 410, and other components described herein might include a processing component that is capable of executing instructions related to the actions described above.

For example, while one exemplary embodiment is described with respect to a wireless environment, it will be appreciated that load sensitive data session scheduling is equally applicable to wired environment. Thus, even though Internet back bones are very powerful (e.g., via optical fiber communications), bandwidth limitations can be present within wired access networks due to e.g., the "last mile" which often comprise copper lines or coaxial cables. So on the access networks offered by ISPs the load sensitive scheduling is beneficial.

Also for example, other methods of determining availability are also contemplated. More specifically, in one method of determining availability, a communication device which is directly making an advance request with the communication network (similar communication as described between the application manager and communication device) is paged by the communication network itself (with the help of a previously assigned token at the time of the advance request) whenever it has resources to spare. In another method, a communication network periodically broadcasts its traffic volume, resource availability, delay and congestion statistics so that a communication device can make use of the information to decide whether to access the network at that instance or not. To avoid all communication devices from overwhelming the communication network at once on seeing a traffic report, the traffic report can also indicate a 'paging group' indicating that only handsets belonging to that group can try at that instance.

As used herein, the terms "component," "system" and the like are intended to refer to a computer-related entity, either hardware, a combination of hardware and software, software, or software in execution. For example, a component may include, but is not limited to, a process running on a processor, a processor, an object, an executable, a thread of execution, a program, and a computer. By way of illustration, both an application running on a computer and the computer can be a component. One or more components may reside within a process and/or thread of execution and a component may be localized on one computer and/or distributed between two or more computers.

As used herein, the terms "user equipment" and "UE" can refer to wireless devices such as mobile telephones, personal digital assistants (PDAs), handheld or laptop computers, and similar devices or other user agents ("UAs") that have telecommunications capabilities. In some exemplary embodiments, a UE may refer to a mobile, wireless device. The term "UE" may also refer to devices that have similar capabilities but that are not generally transportable, such as desktop computers, set-top boxes, or network nodes.

Furthermore, the disclosed subject matter may be implemented as a system, method, apparatus, or article of manufacture using standard programming or engineering techniques, or both, to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Of course, those skilled in the art will recognize many modifications may be made to this configuration without departing from the scope or spirit of the claimed subject matter.

Also, techniques, systems, subsystems and methods described and illustrated in the various exemplary embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein. Although the present teachings have been described in detail, it should be understood that various changes, substitutions and alterations can be made hereto without departing from the spirit and scope of the present teachings as defined by the appended claims.

What is claimed is:

1. A method of linking user requirements of data sessions to network conditions of a communication network, comprising:
receiving, by an application manager executing on a mobile communication device, a data session request from an application;
generating, by the application manager executing on the mobile communication device, a delayed data session request in response to receiving the data session request, wherein the delayed data session request includes a first parameter specifying that data provided responsive to the data session request is to be in a form that exists at a time the delayed data session request is generated, and wherein the delayed data session request further includes a second parameter specifying a type of the communication network over which the data provided responsive to the data session request should be transmitted;
substantially immediately acknowledging, via a processor of the mobile communication device, receipt of the delayed data session request from the application manager executing on the mobile communication device;
transmitting, by the processor of the mobile communication device, the delayed data session request to a server at a later point in time after the processor of the mobile communication device receives the delayed data session request and based at least in part on the network conditions of the communication network to satisfy the data session request; and
receiving, from the server, responsive to the delayed data session request, data in a form that exists at the time the delayed data session request is generated.

2. The method of claim 1 further comprising:
basing setup of a data session requested by the delayed data session request upon actual network conditions.

3. The method of claim 2 wherein:
the actual network conditions are determined by sensing by the mobile communication device.

4. The method of claim 2 wherein:
the actual network conditions are determined via a network load measurement operation.

5. The method of claim 1 wherein:
an entity managing user applications indicates to the mobile communication device in response to each data session request whether the data session is an immediate request to establish immediate use or is an advance request to establish a future data session.

6. The method of claim 1 wherein:
at least one of a plurality of information elements is included with the data session request, the at least one of the plurality of information elements comprising at least one of an identifier of an application session that seeks to use the communication network and details of the data session request.

7. The method of claim 6 wherein:
the details of the data session request comprise at least one of a latest time by when the download session should be completed, and information regarding billing periods and preferences.

8. The method of claim 1 wherein:
the mobile communication device can select a particular access point name (APN) to use when a service to attend to the data session request at a later time based upon network availability is available from a plurality of APNs, the mobile communication device selecting the particular APN based upon network conditions of the plurality of APNs.

9. The method of claim 1, wherein the type of the communication network is selected from among a WiFi network, a Global System for Mobile Communications/Universal Mobile Telecommunications System (GSM/UTMS) network, a Long Term Evolution (LTE) network, and a network of a preferred service provider.

10. The method of claim 1, wherein the delayed data session request further includes a third parameter specifying a desired billing period of the mobile communication device during which the data provided responsive to the data session request should be transmitted, and wherein the billing period corresponds to access by the mobile communication device to the communication network indicated by the second parameter.

11. A system to link user requirements of data sessions to network conditions of a communication network, comprising:
a mobile communication device comprising a processor;
an application manager executing on the mobile communication device to:
receive a data session request from an application executing on the mobile communication device; and
generate a delayed data session request in response to receiving the data session request, wherein the delayed data session request includes a first parameter specifying that data provided responsive to the data session request is to be in a form that exists at a time the delayed data session request is generated, and wherein the delayed data session request further includes a second parameter specifying a type of the communication network over which the data provided responsive to the data session request should be transmitted;
the mobile communication device to substantially immediately acknowledge, via the processor, receipt of the delayed data session request from the application manager executing on the mobile communication device to the application manager; and
the processor to:
transmit the delayed data session request to a server at a later point in time after the processor of the mobile communication device receives the delayed data session request and based at least in part on the network conditions of the communication network to satisfy the data session request; and
receive, from the server, responsive to the delayed data session request, data in a form that exists at the time the delayed data session request is generated.

12. The system of claim 11 wherein:
a data session requested by the delayed data session request is set up based on actual network conditions.

13. The system of claim 12 wherein:
the actual network conditions are determined by sensing by the mobile communication device.

14. The system of claim 12 wherein:
the actual network conditions are determined via a network load measurement operation.

15. The system of claim 11 wherein:
an entity managing user applications indicates to the mobile communication device in response to each data session request whether the data session is an immediate request to establish immediate use or is an advance request to establish a future data session.

16. The system of claim 11 wherein:
at least one of a plurality of information elements is included with the data session request, the at least one of the plurality of information elements comprising at least one of an identifier of an application session that seeks to use the communication network and details of the data session request, wherein the details of the data session request comprise at least one of a latest time by when the download session should be completed, and information regarding billing periods and preferences.

17. The system of claim 11 wherein:
the mobile communication device can select a particular access point name (APN) to use when a service to attend to the data session request at a later time based upon network availability is available from a plurality of APNs, the mobile communication device selecting the particular APN based upon network conditions of the plurality of APNs.

18. The system of claim 11 wherein the mobile communication device is further configured to transmit, via the processor, a data session identifier to the application manager, wherein the data session identifier includes a token identifying a transaction between the application manager and the mobile communication device and a setup indication.

19. An apparatus for linking user requirements of data sessions to network conditions of a communication network, wherein the apparatus is a mobile communication device comprising a processor configured to:
execute an application manager configured to:
receive a data session request from an application executing on the mobile communication device; and
generate a delayed data session request in response to receiving the data session request, wherein the delayed data session request includes a first parameter specifying that data provided responsive to the data session request is to be in a form that exists at a time the delayed data session request is generated, and wherein the delayed data session request further includes a second parameter specifying a type of the communication network over which the data provided responsive to the data session request should be transmitted;
substantially immediately acknowledge receipt by the processor of the delayed data session request from the application manager;
transmit the delayed data session request to a server at a later point in time after the processor receives the delayed data session request and based at least in part on the network conditions of the communication network to satisfy the data session request; and
receive, from the server, responsive to the delayed data session request, data in a form that exists at the time the delayed data session request is generated.

20. The apparatus of claim 19 wherein setup of the data session is based upon actual network conditions.

* * * * *